United States Patent
Debrouwere

(10) Patent No.: US 8,264,183 B2
(45) Date of Patent: Sep. 11, 2012

(54) WINDSHIELD WIPER CONTROL UNIT AND WINDSHIELD WIPER CONTROL METHOD

(75) Inventor: Jonathan Debrouwere, Brussels (BE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 416 days.

(21) Appl. No.: 12/588,762

(22) Filed: Oct. 27, 2009

(65) Prior Publication Data

US 2010/0101040 A1 Apr. 29, 2010

(30) Foreign Application Priority Data

Oct. 29, 2008 (JP) ................................ 2008-278589

(51) Int. Cl.
*H02P 7/00* (2006.01)
*G05B 1/06* (2006.01)
*B60S 1/02* (2006.01)

(52) U.S. Cl. ........ 318/443; 318/444; 318/445; 318/446; 318/456; 318/638; 15/250.12

(58) Field of Classification Search ............... 15/250.12; 318/443, 444, 445, 446, 456, 638
See application file for complete search history.

(56) References Cited

U.S. PATENT DOCUMENTS

| | | | | |
|---|---|---|---|---|
| 6,946,639 B2* | 9/2005 | Stam et al. | ........... | 250/208.1 |
| 7,504,798 B2* | 3/2009 | Kawada et al. | ........... | 318/821 |
| 7,622,878 B2* | 11/2009 | Kawada et al. | ........... | 318/444 |
| 2002/0126015 A1* | 9/2002 | Ishikawa | ........... | 340/601 |
| 2006/0261768 A1* | 11/2006 | Kawada et al. | ........... | 318/443 |
| 2006/0272118 A1* | 12/2006 | Kawada et al. | ........... | 15/250.13 |

FOREIGN PATENT DOCUMENTS

EP 1 724 169 A1 11/2006
(Continued)

OTHER PUBLICATIONS

JP 2648365 B, Outputs from rainfall detection means are accumulated, and a windshield wiper is actuated when the accumulated value is equal to or larger than a predetermined value.

(Continued)

*Primary Examiner* — Walter Benson
*Assistant Examiner* — Gabriel Agared
(74) *Attorney, Agent, or Firm* — Oliff & Berridge, PLC

(57) ABSTRACT

A windshield wiper control unit that controls a windshield wiper based on the position of an operation member, includes: an electric value detection unit that detects an electric value that continuously changes based on the position of the operation member; a setting unit that sets a reference electric value range that is a portion of a variation range of the electric value; a determination unit that determines whether the electric value detected by the electric value detection unit falls within the reference electric value range; and a position determination unit that determines the position of the operation member based on the reference electric value range. When the detected electric value falls outside the reference electric value range, the reference electric value range is updated in such a manner that the electric value, which falls outside the pre-update reference electric value range, falls within the post-update reference electric value range.

14 Claims, 5 Drawing Sheets

FOREIGN PATENT DOCUMENTS

| | | |
|---|---|---|
| EP | 1 731 391 A2 | 12/2006 |
| JP | A-63-195049 | 8/1988 |
| JP | U-5-48420 | 6/1993 |
| JP | A-8-288766 | 11/1996 |
| JP | B2-2648365 | 5/1997 |
| JP | A-10-315919 | 12/1998 |
| JP | A-11-48916 | 2/1999 |
| JP | A-2006-321285 | 11/2006 |
| JP | A-2006-335322 | 12/2006 |

OTHER PUBLICATIONS

JP 63-195049 A, A windshield wiper of which the operation speed is changed based on an externally provided signal (e.g. rainfall sensor).

JP 11-48916 A, An operation speed of a windshield wiper is changed based on a resistance value of a variable resistor.

Extended European Search Report dated Sep. 13, 2010 issued in European Patent Application No. 09174507.5.

Japanese Office Action dated Aug. 20, 2010 issued in Japanese Patent Application 2008-278589 (with partial translation).

* cited by examiner

WINDSHIELD WIPER CONTROL UNIT AND WINDSHIELD WIPER CONTROL METHOD

INCORPORATION BY REFERENCE

The disclosure of Japanese Patent Application No. 2008-278589 filed on Oct. 29, 2008 including the specification, drawings and abstract is incorporated herein by reference in its entirety.

BACKGROUND OF THE INVENTION

1. Field of the Invention

The invention relates to a windshield wiper control unit and a windshield wiper control method that are used to control the operation of a windshield wiper based on the position of an operation member.

2. Description of the Related Art

For example, Japanese Patent Application Publication No. 10-315919 (JP-A-10-315919) describes a windshield wiper control unit that controls the intermittent wiping cycle of a windshield wiper in response to an operation performed on an operation knob. According to JP-A-10-315919, a volume device of which the resistance value continuously changes in response to the operation performed on the operation knob is used, and a detection signal indicating the position of the operation knob is obtained based on the resistance value of the volume device.

Japanese Patent Application Publication No. 2006-321285 (JP-A-2006-321285) describes a windshield wiper control unit that is similar to the windshield wiper described above. The windshield wiper control unit according to JP-A-2006-321285 stores the learned value of the resistance value of the volume device, computes the learned value based on a signal output from the volume device, and corrects the positional information that indicates the position of the volume device based on the result of computation.

The resistance value of the volume device varies from product to product. Therefore, when a detection signal is obtained based on the resistance value as described in JP-A-10-315919, even if a user rotates the operation knob to a desired position, the windshield wiper may fail to operate as the user expects due to the variation in the resistance value.

The configuration described in JP-A-2006-321285 is made with the product-to-product variation in the resistance value of the volume device taken into account. However, the described correction may be made only when the accurate position of the volume device can be obtained. Accordingly, with the configuration described in JP-A-2006-321285, it is not possible to compensate for changes or errors in the resistance value due to the temperature environment under which the product is used or A/D conversion, or changes in the characteristics of the resistance value over time after shipment.

SUMMARY OF THE INVENTION

The invention provides a windshield wiper control unit and a windshield wiper control method that flexibly deal with a change in the resistance value caused during use to accurately detect the position of an operation member.

A first aspect of the invention relates to a windshield wiper control unit that controls an operation of a windshield wiper based on the position of an operation member. The windshield wiper control unit includes: an electric value detection unit that detects an electric value that continuously changes based on the position of the operation member; a setting unit that sets a reference electric value range that is a portion of the variation range of the electric value; a determination unit that determines whether the electric value detected by the electric value detection unit falls within the reference electric value range; and a position determination unit that determines the position of the operation member based on the reference electric value range. When the determination unit determines that the electric value detected by the electric value detection unit falls outside the reference electric value range, the setting unit updates the reference electric value range in such a manner that the electric value, which falls outside the pre-update reference electric value range, falls within the post-update reference electric value range.

The electric value may be, for example, an electric resistance value or a voltage (divided voltage value), which continuously changes based on the position of the operation member. The "electric value that continuously" is not an "electric value that discretely changes", for example, in the configuration in which the resistance value is changed discretely with the use of a switch based on the position of the operation member.

A second aspect of the invention relates to a method for controlling an operation of a windshield wiper based on the position of an operation member. According to the method, an electric value that continuously changes is detected based on the position of the operation member, a reference electric value range that is a portion of a variation range of the electric value is set, whether the detected electric value falls within the reference electric value range is determined, and the position of the operation member is determined based on the reference electric value range. When it is determined that the detected electric value falls outside the reference electric value range, the reference electric value range is updated in such a manner that the electric value, which falls outside the pre-update reference electric value range, falls within the post-update reference electric value range.

According to the aspects of the invention described above, it is possible to flexibly deal with a change in the resistance value caused during use to accurately detect the position of an operation member.

BRIEF DESCRIPTION OF THE DRAWINGS

The features, advantages and technical and industrial significance of this invention will be described in the following detailed description of an example embodiment of the invention with reference to the accompanying drawings, in which like numerals denote like elements, and wherein.

DETAILED DESCRIPTION OF THE EMBODIMENT

Hereafter, an embodiment of the invention will be described with reference to the accompanying drawings.

Figure 1:
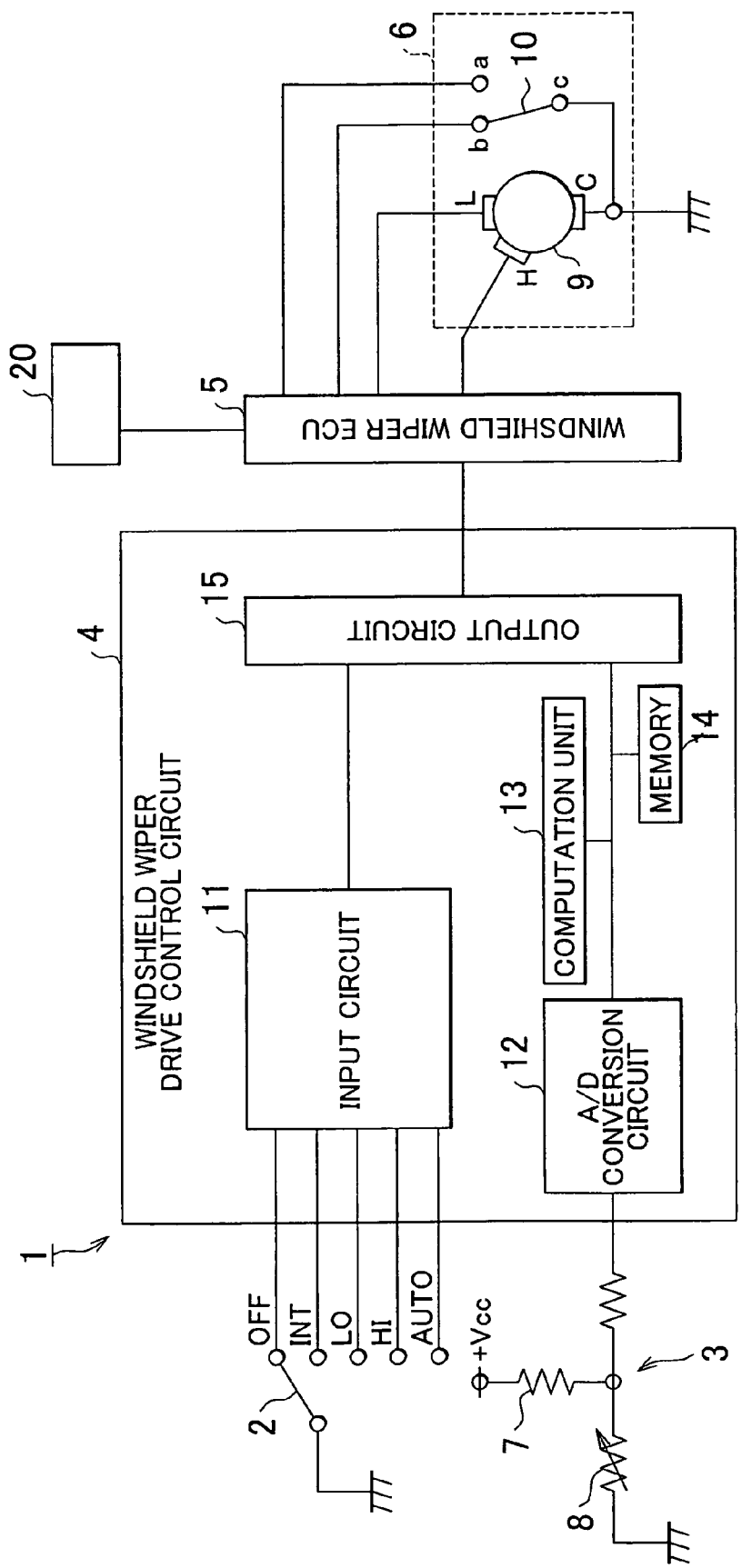
FIG. 1 is a view showing the main configuration of a windshield wiper device that includes a windshield wiper control unit according to an embodiment of the invention.

FIG. 1 is a view showing the main configuration of a windshield wiper device 1 that includes a windshield wiper control unit according to an embodiment of the invention.

The windshield wiper device 1 includes a windshield wiper switch 2, a volume device 3, a windshield wiper drive control circuit 4 to which the windshield wiper switch 2 and the volume device 3 are connected, a windshield wiper ECU 5 to which the windshield wiper drive control circuit 4 is connected, and a windshield wiper drive unit 6 that is connected to the windshield wiper ECU 5.

Figure 2:
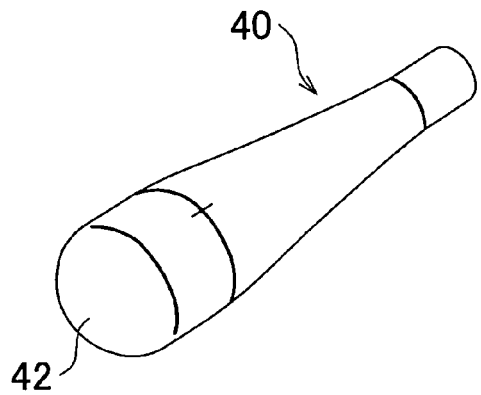
FIG. 2 is a perspective view showing an example of an operation knob.

The position of the windshield wiper switch 2 is switched among a plurality of positions in response to, for example, an operation performed on a windshield wiper operation lever 40 (see FIG. 2) provided in a vehicle compartment. In the embodiment of the invention, the position of the windshield wiper switch 2 is switched among Stop position "OFF", Intermittent wiping mode position "INT", Low speed wiping mode position "LO", High speed wiping mode position "HI", and Automatic mode position "AUTO". The windshield wiper drive control circuit 4 receives a signal that corresponds to the position of the windshield wiper switch 2.

The volume device 3 is housed in, for example, the end portion of the windshield wiper operation lever 40, and the resistance value of the volume device 3 is continuously (linearly in an example shown in the drawings) changed in response to a rotational operation performed on an operation knob 42 attached to the end of the windshield wiper operation lever 40. The intermittent wiping cycle of a windshield wiper is changed by changing the resistance value of the volume device 3. In the embodiment of the invention, the intermittent wiping cycle is changed, for example, in four stages (position P1 to position P4). When the operation knob 42 is in position P1, one intermittent wiping cycle is longest. When the operation knob 42 is in position P4, one intermittent wiping cycle is shortest.

The volume device 3 includes a voltage divider circuit, where a pull-up resistance 7, which is a fixed resistance, and a variable resistance 8 are connected in series. The voltage divider circuit is located between a constant voltage terminal (reference voltage+Vcc) and a ground terminal. A node between the pull-up resistance 7 and the variable resistance 8 is connected to the windshield wiper drive control circuit 4 via a resistance. With this configuration, the volume device 3 generates a signal having a voltage level that corresponds to the resistance value ratio between a resistance value R7 of the pull-up resistance 7 and a resistance value R8 of the variable resistance 8.

The windshield wiper drive control circuit 4 transmits a signal generated based on the signals from the windshield wiper switch 2 and the volume device 3 to the windshield wiper ECU 5. The signal transmitted to the windshield wiper ECU 5 contains the information that indicates the position of the windshield wiper switch 2 and the information that indicates the position of the volume device 3, that is, the position of the operation knob 42. The windshield wiper ECU 5 controls the windshield wiper drive unit 6 based on the signal from the windshield wiper drive control circuit 4.

The windshield wiper drive unit 6 includes a windshield wiper motor 9 and a fixed position stop switch 10. The rotational speed of the windshield wiper motor 9 may be switched in two stages. A high speed rotation terminal H and a low speed rotation terminal L are connected to the windshield wiper ECU 5, and a common terminal c is connected to a ground terminal. The fixed position stop switch 10 has an existing configuration. When the windshield wiper is in the standby state, the fixed position stop switch 10 connects the common terminal c and a normally-closed contact b to each other. When electric power is supplied to the windshield wiper motor 9 and the windshield wiper is brought out of the standby state, the fixed position stop switch 10 connects the common terminal c and a normally-open contact a to each other. The normally-open contact a and the normally-closed contact b are connected to the windshield wiper ECU 5, and the common terminal c is connected to a ground line.

The windshield wiper ECU 5 is formed mainly of a microcomputer, and includes a CPU, a ROM that stores certain control programs, etc., a RAM that temporarily stores data, an input interface and an output interface. The windshield wiper ECU 5 may contain a part of or the entirety of the functions of the windshield wiper drive control circuit 4. A rain sensor 4 that detects the rainfall is connected to the windshield wiper ECU 5.

The windshield wiper ECU 5 supplies a drive current to the windshield wiper motor 9 based on the position of the windshield wiper switch 2. When the windshield wiper switch 2 is in Low speed wiping mode position "LO", the windshield wiper ECU 5 supplies a drive current to the windshield wiper motor 9 from the low speed rotation terminal L. When the windshield wiper switch 2 is in High speed wiping mode position "HI", the windshield wiper ECU 5 supplies a drive current to the windshield wiper motor 9 from the high speed rotation terminal H. The windshield wiper motor 9 rotates at a low speed or a high speed depending on the supplied drive current, and the windshield wiper wipes the windshield at a low speed or a high speed. When the windshield wiper switch 2 is operated to Stop position "OFF", the windshield wiper ECU 5 stops supply of a drive current to the windshield wiper motor 9 to stop the rotation of the windshield wiper motor 9.

When the windshield wiper switch 2 is in Intermittent wiping position "INT", the windshield wiper ECU 5 intermittently supplies a drive current from the low speed rotation terminal L to the windshield wiper motor 9 based on the state of the fixed position stop switch 10 to intermittently drive the windshield wiper motor 9, that is, to intermittently drive the windshield wiper. In this case, the windshield wiper ECU 5 changes the intermittent drive cycle of the windshield wiper motor 9, that is, the intermittent wiping cycle of the windshield wiper based on the information that indicates the position of the operation knob 42, that is, the position of the volume device 3.

When the windshield wiper switch 2 is in Automatic mode position "AUTO", if rainy weather is detected based on a signal from the rain sensor 20, the windshield wiper ECU 5 supplies a drive current to the windshield wiper motor 9 to automatically actuate the windshield wiper. In this case, as in the case where the windshield wiper switch 2 is in Intermittent wiping mode position "INT", the windshield wiper ECU 5 changes the intermittent drive cycle of the windshield wiper motor 9, that is, the intermittent wiping cycle of the windshield wiper based on the information that indicates the position of the operation knob 42, that is, the position of the volume device 3.

The windshield wiper drive control circuit 4 will be described below.

The windshield wiper drive control circuit 4 includes an input circuit 11 that receives a signal from the windshield wiper switch 2, an A/D conversion circuit 12 that receives the voltage from the volume device 3, a computation unit 13 that detects the position of the operation knob 42 etc. based on the value output from the value from the A/D conversion circuit 12, a memory 14 that stores the results of computation executed by the computation unit 13 etc., and an output circuit 15. The A/D conversion circuit 12, the computation unit 13, the memory 14, and the output circuit 15 are connected to each other. The output circuit 15 transmits a signal indicating the correction value computed by the computation unit 13 and a signal received from the input circuit 11 to the windshield wiper ECU 5.

The computation unit 13 computes the resistance value of the variable resistance 8 based on a signal output from the A/D conversion circuit 12. The signal output from the A/D conversion circuit 12 has a digital value that corresponds to the voltage of the volume device 3, that is, the voltage (hereinafter, referred to as "volume voltage Vr") that is obtained by dividing the potential difference between the reference voltage Vcc, and the ground voltage based on the resistance ratio between the pull-up resistance 7 and the variable resistance 8. The digital value of the volume voltage Vr and the resistance value R8 of the variable resistance 8 are in a one-to-one correspondence relationship. More specifically, the relationship between the digital value of the volume voltage Vr and the resistance value R8 is expressed by the following equation using the resistance value R7 of the pull-up resistance 7 and the digital value of the reference voltage Vcc.

$$R8 = R7 \times (Vr/(Vcc-Vr))$$

Here, the resistance value R7 of the pull-up resistance 7 and the value of the reference voltage Vcc are known values (designed values) and stored in the memory 14. The computation unit 13 determines the position of the operation knob 42 (P1 to P4) based on the digital value of the volume voltage Vr, in a manner described below, and with the use of the position determination data stored in the memory 14.

Figure 3:
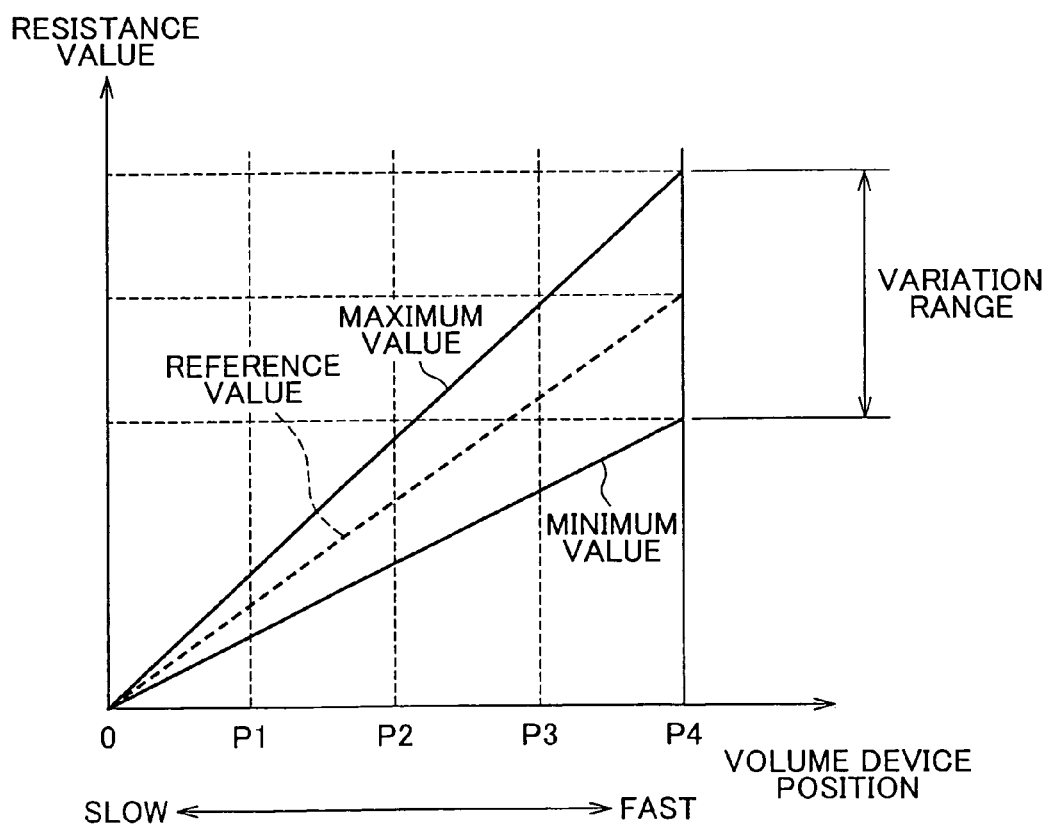
FIG. 3 is a graph showing the relationship between the position of the operation knob and the resistance value.

FIG. 3 is a graph showing the relationship (characteristic) between the position of the operation knob 42 and the resistance value R8.

As shown in FIG. 3, the resistance value R8 of the variable resistance 8 varies within a certain variation range centered at the reference value due to the tolerances of the products. Therefore, even if the position of the operation knob 42 is the same, the value of the volume voltage Vr (or the resistance value R8) may vary due to the variation in the variable resistance 8. Even in one and the same product (variable resistance 8), the relationship (characteristic) between the position of the operation knob 42 and the volume voltage Vr may change due to, for example, the influence of the temperature environment under which the product is used or the tolerance of A/D conversion or the influence of changes with time after shipment. The same applies to the pull-up resistance 7.

Therefore, according to the embodiment of the invention, the distinctive configuration described below in detail is provided to reliably compensate for the changes in the relationship between the position of the operation knob 42 and the volume voltage Vr due to, for example, the temperature environment under which the product is used. As a result, the position of the operation knob 42 is accurately detected.

Figure 4:
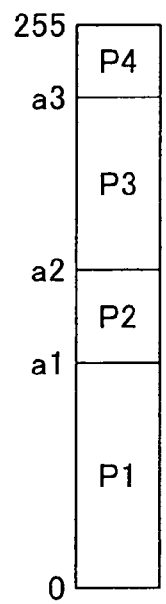
FIG. 4 is a conceptual view showing the position determination data stored in a memory.

FIG. 4 is a conceptual view showing the position determination data stored in the memory 14. The position determination data is a given data that indicates the digital values of the volume voltage Vr, which are included in the respective volume voltage ranges that correspond to positions P1 to P4. In an example in FIG. 4, the position determination data has the volume voltage range from 0 to 255 (volume voltage range having a width of 256), since the volume voltage Vr is expressed by an 8-bit digital value. The volume voltage range from 0 to 255 corresponds to the range of values that may be taken by the volume voltage Vr. The volume voltage range equal to or higher than 0 and lower than a1 corresponds to position P1, the volume voltage range equal to or higher than a1 and lower than a2 corresponds to position P2, the volume voltage range equal to or higher than a2 and lower than a3 corresponds to position P3, and the volume voltage range equal to or higher than a3 corresponds to position P4. The values a1, a2 and a3 may be set in advance based on the reference values (FIG. 3). The form for expressing the position determination data may be any appropriate form, and the bit number may be any appropriate number.

Figure 5:
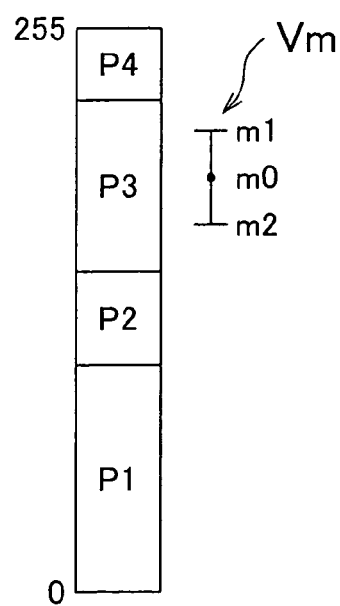
FIG. 5 is a conceptual view showing the relationship between the position determination data and the window Vm.

FIG. 5 is a conceptual view showing the relationship between the position determination data and the window Vm. The window Vm is set to a part of the range of values that may be taken by the volume voltage Yr. Preferably, the window Vm is set to the volume voltage range that is smaller than each of the volume voltage ranges that correspond to positions P1 to P4. That is, preferably, the window Vm has a volume voltage range that may be included in each of the volume voltage ranges that correspond to positions P1 to P4. In an example shown in FIG. 5, the window Vm is set within the volume voltage range that corresponds to position P3 (i.e. $a2 \leq Vm \geq a3$), and has the volume voltage range that is defined by the lower limit m2 and the upper limit m1 (center value is m0). The width of the window Vm (m2−m1+1) is a fixed value that is set with, for example, the variation range taken into account. In this example, the window Vm is set to the volume voltage range between m0−3 and m0+3.

Figure 6:
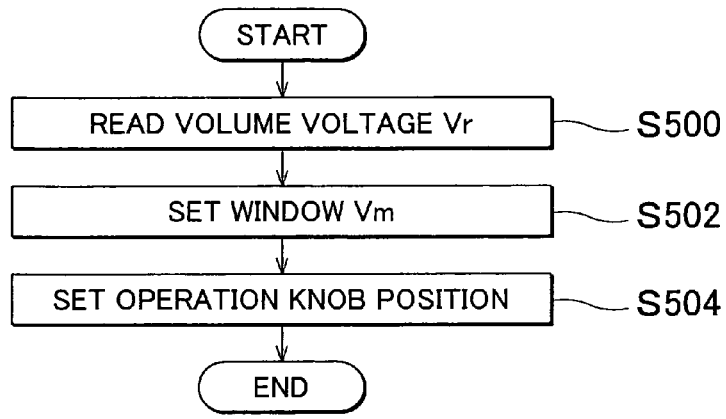
FIG. 6 is a flowchart showing an initial routine of a routine for determining the position of the operation knob, which is executed by a computation unit according to the embodiment of the invention.
Figure 7:
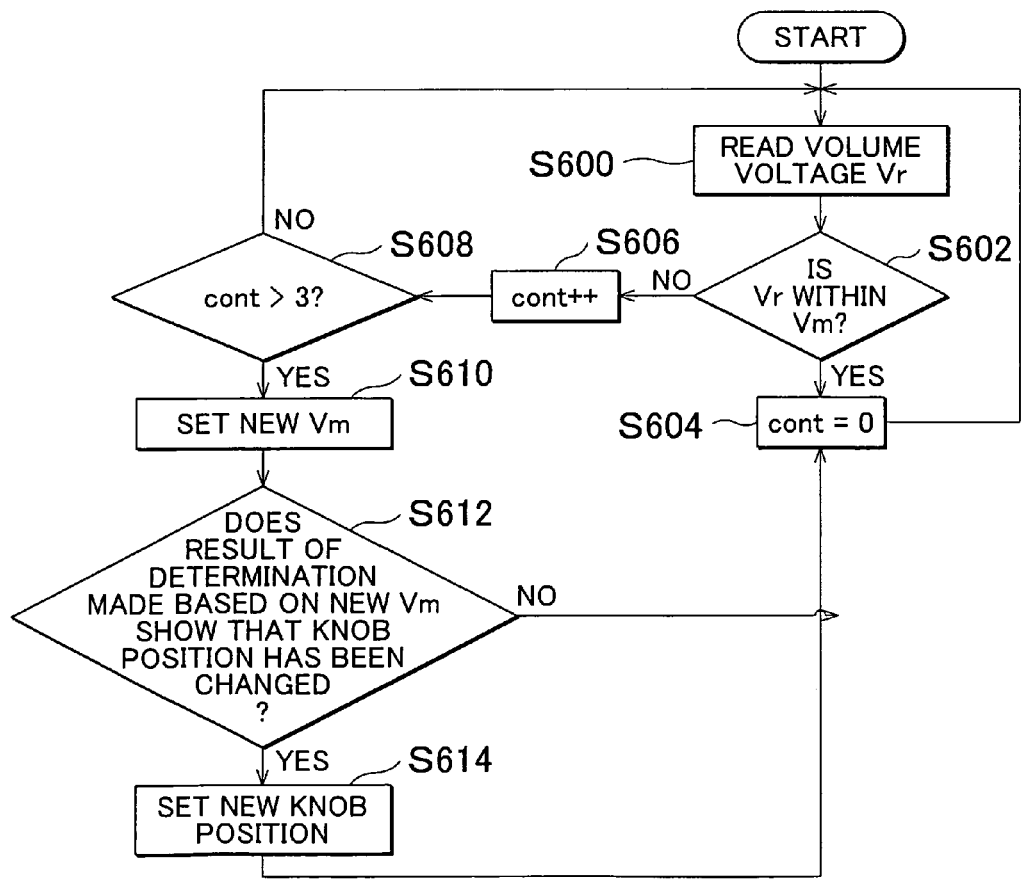
FIG. 7 is a flowchart showing a main routine of the routine for determining the position of the operation knob, which is executed by the computation unit according to the embodiment of the invention.

FIG. 6 is a flowchart showing an initial routine of a routine for determining the position of the operation knob 42, which is executed by the computation unit 13 according to the embodiment of the invention. FIG. 7 is a flowchart showing a main routine of the routine for determining the position of the operation knob 42. The initial routine shown in FIG. 6 may be executed, for example, when an ignition switch is turned on, or when the windshield wiper switch 2 is operated to Automatic mode position "AUTO".

In step (hereinafter, referred to as "S") 500, the digital value of the volume voltage Vr is read.

In S502, the window Vm is set (initial setting) based on the volume voltage Vr read in S500. In this example, the window Vm is set using the digital value of the current volume voltage Vr as the center value m0 (see FIG. 5), and stored.

In S504, the current position of the operation knob 42 is determined (detected) based on the window Vm set in S502, and the determined position of the operation knob 42 is set. In the embodiment of the invention, the current position of the operation knob 42 is determined based on the volume voltage range which is one of the volume voltage ranges that correspond to positions P1 to P4 (see FIG. 4) and in which the center value m0 of the window Vm falls. For example, when the window Vm shown in FIG. 5 is set, it is determined that the current position of the operation knob 42 is position P3 because the center value m0 of the window Vm is within the volume voltage range that corresponds to position P3.

When the initial routine shown in FIG. 6 ends, the main routine shown in FIG. 7 is periodically executed with the use of the window Vm set in S502 from the next cycle. After the initial routine shown in FIG. 6 ends, the main routine shown in FIG. 7 may be periodically executed in predetermined cycles, for example, until the ignition switch is turned off, or until the windshield wiper switch 2 is operated to one of the positions other than "AUTO" position.

In S600, the digital value of the volume voltage Vr in the current cycle is read.

In S602, it is determined whether the volume voltage Vr read in S600 is within the volume voltage range of the window Vm. If it is determined that the volume voltage Vr is within the volume voltage range of the window Vm, S604 is executed. On the other hand, if it is determined that the volume voltage Vr is outside the volume voltage range of the window Vm, S606 is executed.

In S604, the counter value is reset to zero.

In S606, the counter value is incremented by 1.

In S608, it is determined whether the counter value is higher than a predetermined value. The predetermined value is used to reliably distinguish a change in the volume voltage Vr that is caused not by an operation performed by a user but by, for example, a tolerance from a change in the volume voltage Vr due to an operation performed by the user. In this example, the predetermined value is set to 3. If it is determined that the counter value is higher than 3, S610 is executed. On the other hand, if it is determined that the counter value is equal to or lower than 3, the process in current cycle ends and S600 is executed again.

In S610, the new window Vm is set based on the volume voltage Vr read in S600 in the current cycle. That is, the window Yin is changed based on the volume voltage Vr that falls outside the volume voltage range of the window Vm. The new window Vm is set using the digital value of the current volume voltage Vr in the current cycle as the center value m0 (see FIG. 5) and stored.

In S612, the current position of the operation knob 42 is determined based on the new window Vm set in S610, and whether the position of the operation knob 42 has been changed is determined. The method for determining the current position of the operation knob 42 may be the same as that used in S504. If is determined that the position of the operation knob 42 has been changed, S614 is executed. On the other hand, if it is determined that the position of the operation knob 42 has not been changed, S600 is executed again after executing S604 (resetting the counter value to 0).

In S614, the new position of the operation knob 42 is set, and S600 is executed again after executing S604 (resetting the counter value to 0).

Figure 8:
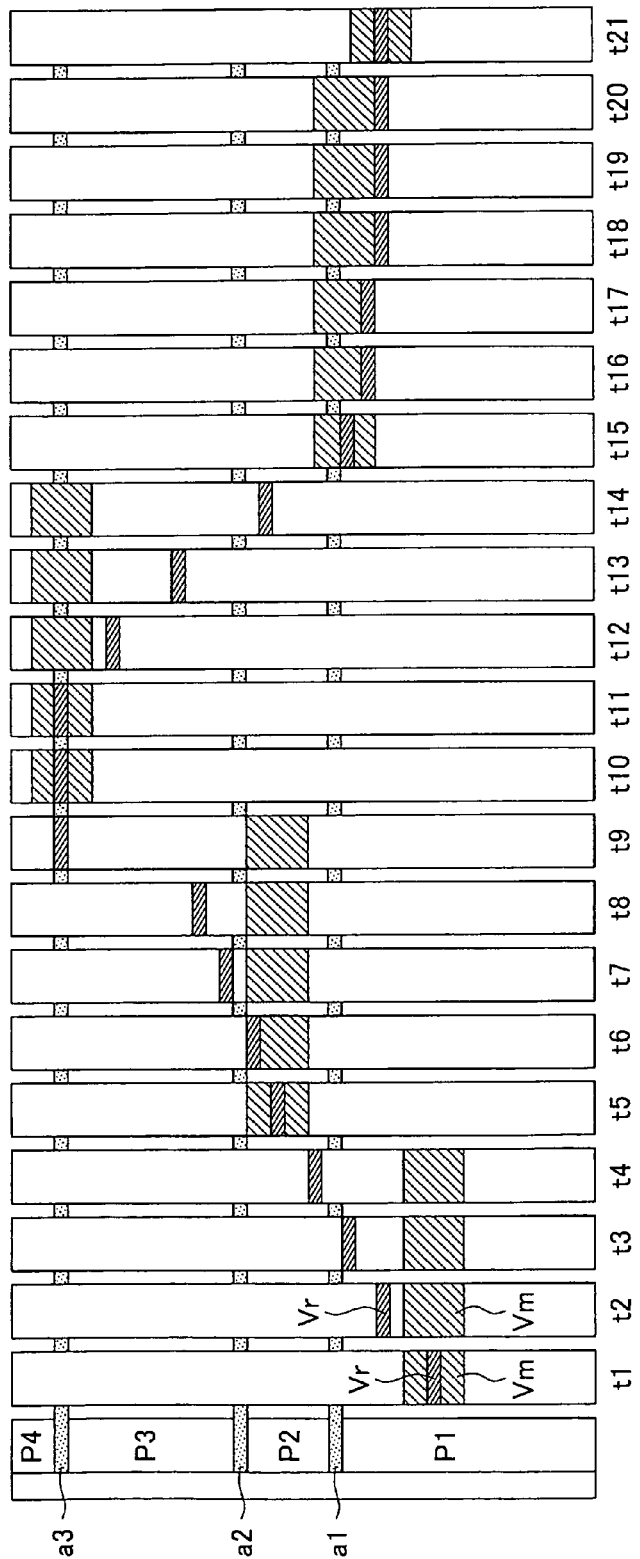
FIG. 8 is a view showing an actual example of the routine for determining the position of the operation knob, which is shown in FIGS. 6 and 7 and which is executed by the computation unit according to the embodiment of the invention.

FIG. 8 is a view showing an actual example of the routine for determining the position of the operation knob 42, which is shown in FIGS. 6 and 7 and which is executed by the computation unit 13 according to the embodiment of the invention. The position determination data shown in FIG. 4 is indicated in on the far left in FIG. 8. In FIG. 8, the manner in which the volume voltage Vr is changed and the manner in which the window Vm is set based on the change in the volume voltage Vr are shown from left to right in the chronological order. In FIG. 8, the routine for determining the position of the operation knob 42 is executed in a cycle of 10 milliseconds (ms).

First, at time t1, initial setting of the window Vm is executed based on the volume voltage Vr shown at time t1 according to the routine shown in FIG. 6. In this example, because the center value of the window Vm is within the volume voltage range that corresponds to position P1, as shown in FIG. 8, position P1 is set as the position of the operation knob 42 (see S504 in FIG. 6).

Next, at time t2, the user starts rotating the operation knob 42, the volume voltage Vr is outside the volume voltage range of the window Vm, and the counter value becomes 1.

Next, at time t3, the user is rotating the knob 42, the volume voltage Vr is outside the volume voltage range of the window Vm, and the counter value becomes 2.

Next, at time t4, the user is rotating the operation knob 42, the volume voltage Vr is outside the volume voltage range of the window Vm, and the counter value becomes 3.

Next, at time t5, the user is rotating the operation knob 42, the volume voltage Vr is outside the volume voltage range of the window Vm, and the counter value becomes 4. Accordingly, at time t5, because the counter value is higher than 3, the new window Vm is set as shown in FIG. 8 (see S610 in FIG. 7). In this example, position P2 is set as the position of the operation knob 42 (see S614 in FIG. 7) based on the volume voltage Vr that is within the volume voltage range that corresponds to position P2, and the counter value is reset to 0 (see S604 in FIG. 7).

Next, at time t6, although the user is rotating the operation knob 42, the volume voltage Vr is within the volume voltage range of the window Vm and the counter value is set to 0 (see S604 in FIG. 7).

Next, at time t7, the user is rotating the operation knob 42, the volume voltage Vr is outside the volume voltage range of the window Vm, and the counter value becomes 1.

At time t8 and time t9, the user is rotating the operation knob 42, and the counter value becomes 2, and 3, respectively. At time t10, the counter value becomes 4, and the new window Vm is set as shown in FIG. 8 (see S610 in FIG. 7). In this example, position P4 is set as the position of the operation knob 42 (see S614 in FIG. 7) based on the volume voltage Vr that is within the volume voltage range that corresponds to position P4, and the counter value is reset to 0 (see S604 in FIG. 7).

Time t1 to time t11 are set at intervals of 10 milliseconds, and the interval between time #11 and time 12 is 5 minutes. During this period of 5 minutes, the user does not rotate the operation knob 42. In this period from time t11 and time t12, indication of intervals of 10 milliseconds is omitted on the assumption that the volume voltage does not change.

At time 12, the user starts rotating the operation knob 12, the volume voltage Vr is outside the volume voltage range of the window Yin, and the counter value becomes 1.

At time 13 and time 14, the user is rotating the operation knob 42, and the counter value becomes 2, and 3, respectively. At time t15, the counter value becomes 4, and the new window Vm is set, as shown in FIG. 8 (see S610 in FIG. 7). In this example, position P1 is set as the position of the operation knob 42 (see S614 in FIG. 7) based on the volume voltage Vr that is within the volume voltage range that corresponds to position P1, and the counter value is reset to 0 (see S604 in FIG. 7).

Next, at time t16, although the user is rotating the operation knob 42, the volume voltage Vr is within the volume voltage range of the window Vm, and the counter value is set to 0 (see S604 in FIG. 7).

Time t12 to time t16 are set at intervals of 10 milliseconds, and the interval between time t17 and time 18 is 5 minutes. During this period of 5 minutes, the user does not rotate the operation knob 42. In this period from time t17 and time t18, indication of intervals of 10 milliseconds is omitted on the assumption that the volume voltage does not change.

At time t18, although the user is still not rotating the operation knob 42, the volume voltage Vr has been changed from the immediately preceding value (value at time t17). This change is due to the above-described variation (e.g. tolerance of A/D conversion). Therefore, at time t18, the volume voltage Vr is outside the volume voltage range of the window Vm, and the counter value becomes 1.

Similarly, at time t19 and time t20, the volume voltage Vr is outside the volume voltage range of the window Vm for the same reason at time 18, and the counter value is incremented to 2, and 3, respectively.

At time t21, the volume voltage Vr is still outside the volume voltage range of the window Vm for the same reason at time t18, and the counter value becomes 4. As shown in FIG. 8, the new window Vm is set (see S610 in FIG. 7). In this example, because the center value m0 of the new window Vm is within the volume voltage range that corresponds to position P1, it is determined that the position of the operation knob 42 has not been changed ("NO" in S612 in FIG. 7) and the counter value is reset to 0 (see S604 in FIG. 7). Accordingly, in this case, position P1 is continuously used as the position of the operation knob 42.

The windshield wiper control device according to the embodiment of the invention described so far produces the following effects.

First, it is determined whether the volume voltage Vr is within the window Vm having a predetermined width as described above. As long as the volume voltage Vr is within the window Vm, the result of determination on the position of the operation knob 42 does not change even if the volume voltage Vr is changed. Therefore, it is possible to avoid the situation where the result of determination on the position of the operation knob 42 is excessively influenced by a minute change in the volume voltage Vr that does not cause the volume voltage to fall within the window Vm.

If a relatively large change in the volume voltage Vr, which may cause the volume voltage Vr to fall outside the window Vm, occur due to, for example, a tolerance, the window Vm is changed reliably in response to the change in the volume voltage Vr. Therefore, it is possible to reliably detect a change in the volume voltage Vr due to an operation performed by a user while dealing with the variations in the volume voltage Vr due to the influence of, for example, the tolerance of the A/D conversion Or the temperature.

The embodiment of the invention has been described above. Note that, the invention is not limited to the above-described embodiment. Various modifications and changes may be made to the above-described embodiment within the scope of the invention.

For example, in the embodiment described above, the current position of the operation knob 42 is determined based on the volume voltage range which is one of the volume voltage ranges that correspond to positions P1 to P4 (see FIG. 4) and in which the center value m0 of the window Vm falls. Alternatively, the current position of the operation knob 42 may be determined based on the volume voltage range which is one of the volume voltage ranges that correspond to positions P1 to P4 (see FIG. 4) and in which the upper limit m1 (see FIG. 5) of the window Vm falls.

Similarly, the current position of the operation knob 42 may be determined based on the volume voltage range which is one of the volume voltage ranges that correspond to positions P1 to P4 (see FIG. 4) and in which the lower limit m2 (see FIG. 5) of the window Vm falls.

Alternatively, the current position of the operation knob 42 may be determined based on the volume voltage range which is one of the volume voltage ranges that correspond to positions P1 to P4 (see FIG. 4) and in which the largest portion of the window Vm falls. This configuration is equivalent to the configuration in the above-described embodiment in which the current position of the operation knob 42 is determined with the use of the center value m0 of the window Vm when the width of the window Vm is an odd number (e.g., the width of the window Vm is 7 as in the above-described embodiment). However, when the width of the window Vm is an even number (e.g. 6), if a portion of the window Vm, which has a width of 2, is within the volume voltage range that corresponds to position P1, and the other portion of the window Vm, which has a width of 4, is within the volume voltage range that corresponds to position P2, it is determined that the position of the operation knob 42 is position P2.

Alternatively, the current position of the operation knob 42 may be determined based on the volume voltage range which is one of the volume voltage ranges that correspond to positions P1 to P4 (see FIG. 4) and in which the entirety of the window Vm falls. With this configuration, for example, if the entirety of the window Vm is within the volume voltage range that corresponds to position P2, it is determined that the position of the operation knob 42 is position P2. With this configuration, the window Vm is set (including initial setting) in such a manner that the entirety of the window Vm is within one of the volume voltage ranges that correspond to positions P1 to P4. Accordingly, if the new window Vm is set based on the volume voltage Vr in S610 in FIG. 7, if the entirety of the window Vm is within none of the volume voltage ranges that correspond to positions P1 to P4 (the window Vm straddles the boarder of the two adjacent volume voltage ranges among the volume voltage ranges that correspond to positions P1 to P4), setting of the new window Vm may be omitted in this cycle, the counter value may be incremented, and an S600 may be executed again. In this case, setting of the new window Vm is suspended until the entirety of the window Vm falls within one of the volume voltage ranges that correspond to positions P1 to 4 (see FIG. 4).

In the embodiment of the invention described above, if it is determined that the volume voltage Vr is outside the volume voltage range of the window Vm in predetermined number of successive cycles (4 cycles, in the above-described embodiment), the new window Vm is set based on the volume voltage Vr that is detected when the predetermined number of cycles end. The new window Vm may be set based on at least two volume voltages Vr among the predetermined number of volume voltages Vr in the predetermined number of cycles. For example, the new window Vm may be set based on, for example, the average value or the weighting average value of the volume voltages Vr in the last two cycles among the predetermined number of cycles (in the example described above, the volume voltages Vr in the last two cycles among the four cycles).

In the embodiment described above, when the windshield wiper switch 2 is in Automatic mode position "AUTO", the windshield wiper ECU 5 changes the intermittent wiping cycle based on the information that indicates the position of the operation knob 42. Alternatively, when the windshield wiper switch 2 is in Automatic mode position "AUTO", the windshield wiper ECU 5 may change the intermittent wiping cycle and/or switch the terminal through which a drive current is supplied to the windshield wiper motor 9 between the high speed rotation terminal H and the low speed rotation terminal L to change the operation speed of windshield wiper (wiping speed) based on the information that indicates the position of the operation knob 42. When the windshield wiper switch 2 is in Automatic mode position "AUTO", the windshield wiper ECU 5 may change the rainfall threshold at which the windshield wiper is automatically actuated based on the information that indicates the operation knob 42.

In the embodiment described above, the width (range) of the window is a fixed value (in the embodiment, 7 in digital value). Alternatively, the width of the window Vm may be variable. For example, as shown in FIG. 3, when the window Vm inset based on the volume voltage Vr within the volume voltage range that corresponds to position P4, the width of the window Vm may be larger than when the window Vm is set based on the volume voltage Vr within the volume voltage range that corresponds to position P1, because the variation range of the resistance value is larger in the volume voltage range that corresponds to position P4 than the volume voltage range that corresponds to position P1.

In the embodiment of the invention described above, the position determination data is the given data that indicates the relationship between the volume voltage ranges that correspond to positions P1 to P4 and the volume voltage Vr. Alternatively, the position determination data may be a given data that equivalently indicates the relationship between the volume voltage ranges that correspond to positions P1 to P4 and the resistance value R8.

In the embodiment of the invention described above, in the position determination data, the volume voltage ranges that correspond to positions P1 to Pr are uneven. Alternatively, the position determination data in which the volume voltage ranges that correspond to positions P1 to P4 are even may be used.

What is claimed is:

1. A windshield wiper control unit that controls an operation of a windshield wiper based on a position of an operation member, comprising:
    an electric value detection unit that detects an electric value that continuously changes based on the position of the operation member;
    a storage unit that stores position determination ranges that are formed by dividing the variation range of the electric value into multiple non-overlapping electric value ranges, and that correspond one-to-one with multiple positions of the operation member;
    a setting unit that sets a reference electric value range that is a portion of a variation range of the electric value;
    a determination unit that determines whether the electric value detected by the electric value detection unit falls within the reference electric value range; and
    a position determination unit that determines the position of the operation member based on a relationship between the reference electric value range and the position determination ranges, wherein
    when the determination unit determines that the electric value detected by the electric value detection unit continuously falls outside the reference electric value range for at least a predetermined time period, the setting unit updates the reference electric value range in such a manner that the electric value, which falls outside the pre-update reference electric value range, falls within the post-update reference electric value range.

2. The windshield wiper control unit according to claim 1, wherein the setting unit updates the reference electric value range in such a manner that a center value of the post-update reference electric value range is equal to the electric value that falls outside the pre-update reference electric value range.

3. The windshield wiper control unit according to claim 1, wherein the windshield wiper control unit controls at least one of an intermittent wiping cycle of the windshield wiper and an operation speed of the windshield wiper based on the position of the operation member that is determined by the position determination unit.

4. The windshield wiper control unit according to claim 1, wherein the reference electric value range is smaller than each of all the position determination ranges.

5. The windshield wiper control unit according to claim 1, wherein the position determination unit determines the position of the operation member based on the position determination range in which an upper limit of the reference electric value range falls.

6. The windshield wiper control unit according to claim 1, wherein the position determination unit determines the position of the operation member based on the position determination range in which a lower limit of the reference electric value range falls.

7. The windshield wiper control unit according to claim 1, wherein the position determination unit determines the position of the operation member based on the position determination range in which a center value of the reference electric value range falls.

8. The windshield wiper control unit according to claim 1, wherein the position determination unit determines the position of the operation member based on the position determination range in which a largest portion of the reference electric value range falls.

9. The windshield wiper control unit according to claim 1, wherein:
    only when an entirety of the post-update reference electric value range, which has a center value equal to the electric value that falls outside the pre-update electric value range, is predicted to be within one of the position determination ranges, the setting unit updates the reference electric value range in such a manner that a center value of the post-update reference electric value range is equal to the electric value that falls outside the pre-update electric value range; and
    the position determination unit determines the position of the operation member based on the position determination range in which the entirety of the reference electric value range falls.

10. The windshield wiper control unit according to claim 1, wherein
    the electric value detection unit detects the electric value in predetermined cycles; and
    when the determination unit determines that the electric value detected by the electric value detection unit falls outside the reference electric value range at least predetermined number of times in a row, the setting unit updates the reference electric value range.

11. The windshield wiper control unit according to claim 1, wherein a width of the reference electric value range is a fixed value.

12. The windshield wiper control unit according to claim 1, wherein a width of the reference electric value range is variable.

13. A method for controlling an operation of a windshield wiper based on a position of an operation member, comprising:
    detecting an electric value that continuously changes based on the position of the operation member;
    setting a reference electric value range that is a portion of a variation range of the electric value;
    storing position determination ranges that are formed by dividing the variation range of the electric value into multiple non-overlapping electric value ranges, and that correspond one-to-one with multiple positions of the operation member;

determining whether the detected electric value falls within the reference electric value range;

determining the position of the operation member based on a relationship between the reference electric value range and the position determination ranges; and updating, when it is determined that the detected electric value continuously falls outside the reference electric value range for at least a predetermined time period, the reference electric value range in such a manner that the electric value, which falls outside the pre-update reference electric value range, falls within the post-update reference electric value range.

14. The method according to claim 13, wherein:

the electric value is detected in predetermined cycles; and when it is determined that the detected electric value falls outside the reference electric value range at least predetermined number of times in a row, the reference electric value range is updated.

* * * * *